United States Patent
Godon et al.

(10) Patent No.: US 9,238,282 B2
(45) Date of Patent: Jan. 19, 2016

(54) METHOD FOR MANUFACTURING A METAL PART

(75) Inventors: Thierry Godon, Sevran (FR); Bruno Jacques Gerard Dambrine, Le Chatelet en Brie (FR); Alain Robert Yves Perroux, Ris Orangis (FR)

(73) Assignee: SNECMA, Paris (FR)

( * ) Notice: Subject to any disclaimer, the term of this patent is extended or adjusted under 35 U.S.C. 154(b) by 194 days.

(21) Appl. No.: 14/000,609

(22) PCT Filed: Feb. 24, 2012

(86) PCT No.: PCT/FR2012/050396
§ 371 (c)(1),
(2), (4) Date: Aug. 21, 2013

(87) PCT Pub. No.: WO2012/114053
PCT Pub. Date: Aug. 30, 2012

(65) Prior Publication Data
US 2013/0319067 A1 Dec. 5, 2013

(30) Foreign Application Priority Data
Feb. 25, 2011 (FR) ...................................... 11 51585

(51) Int. Cl.
| | |
|---|---|
| *B23P 15/04* | (2006.01) |
| *B29D 99/00* | (2010.01) |
| *B23P 15/02* | (2006.01) |
| *B22F 3/15* | (2006.01) |

(Continued)

(52) U.S. Cl.
CPC . *B23P 15/04* (2013.01); *B22F 3/15* (2013.01); *B22F 5/04* (2013.01); *B23K 20/021* (2013.01);
(Continued)

(58) Field of Classification Search
CPC ............ B23P 15/04; B23P 15/02; B22F 3/04; B22F 5/04; B22F 3/15; B22F 2003/153; B23K 20/021; B23K 20/004; B29D 99/0025; B29D 99/0028; C22C 47/04; C22C 47/06; C22C 47/062; C22C 47/064; C22C 47/066; C22C 47/068; C22C 47/20
USPC .............. 72/342.7, 342.1, 364, 340; 264/280; 29/889.2, 889.21, 889.23, 889.3, 29/889.6, 889.61, 889.7, 889.71, 889.72; 416/224; 419/24, 49
See application file for complete search history.

(56) References Cited

U.S. PATENT DOCUMENTS 5,240,376 A * 8/1993 Velicki ...................... 416/229 A
5,400,505 A    3/1995 Wei et al.
(Continued)

FOREIGN PATENT DOCUMENTS

WO     2009 034264     3/2009

OTHER PUBLICATIONS

International Search Report Issued Sep. 19, 2012 in PCT/FR12/050396 Filed Feb. 24, 20112.

*Primary Examiner* — Peter DungBa Vo
*Assistant Examiner* — Joshua D Anderson
(74) *Attorney, Agent, or Firm* — Oblon, McClelland, Maier & Neustadt, L.L.P.

(57) ABSTRACT

A method for manufacturing a metal part by producing a preform with a fibrous structure of metal fibers, and subjecting the preform to hot isostatic pressing in a tool until a solid part is obtained, the tool including at least one first element including a cavity for molding the part. The first tool element is elongate in a direction between two ends, and the fibrous structure is at least partially formed by winding at least one metal wire around the first tool element in the direction, from one end to the other. The method can be used, for example, for manufacturing reinforcement parts for a fan blade of a turbojet engine.

9 Claims, 2 Drawing Sheets

(51) Int. Cl.
  *B22F 5/04* (2006.01)
  *C22C 47/06* (2006.01)
  *B23K 20/02* (2006.01)
  *C22C 47/04* (2006.01)
(52) U.S. Cl.
  CPC ............ *B23P 15/02* (2013.01); *B29D 99/0025* (2013.01); *C22C 47/04* (2013.01); *C22C 47/064* (2013.01); *B29D 99/0028* (2013.01)

(56) References Cited

U.S. PATENT DOCUMENTS

| | | | |
|---|---|---|---|
| 6,658,715 B1 * | 12/2003 | Podesta' | 29/419.1 |
| 6,698,645 B1 | 3/2004 | Buchberger et al. | |
| 7,325,306 B2 * | 2/2008 | Twigg | 29/889.71 |
| 2007/0092379 A1 * | 4/2007 | Coupe et al. | 416/241 R |
| 2011/0143089 A1 | 6/2011 | Dunleavy et al. | |

* cited by examiner

METHOD FOR MANUFACTURING A METAL PART

FIELD OF THE INVENTION

The present invention relates to the manufacture of a metal part using the technique of hot isostatic compression of a preform formed of a fibrous structure containing metallic wires with the possible insertion of ceramic-fiber-based reinforcements.

The invention is aimed in particular for the manufacture of a reinforcement for large-sized blades made of organic composite, such as turbine engine fan blades or propeller blades.

PRIOR ART

The fan blades in modern engines are very large in size, and, in order to combine mechanical strength with lightness of weight, production in organic composite is sought.

In order to allow them to resist abrasion and foreign-object damage, provision is made for the exposed zones, particularly the upstream surface of the blade, to be protected by a metal part that offers greater resistance to this type of attack than the composite alone.

According to one known embodiment, this reinforcement, which is attached to the blade made of composite, extends in a substantially radial direction with respect to the axis of rotation of the fan rotor, along the leading edge. It is extended on each side of the leading edge onto part of the intrados and extrados faces, tapering toward the downstream direction. It therefore has the shape of a C in cross section, having a relatively thick central branch and tapering lateral branches. The profile of the reinforcements is also twisted and curved between the root and the tip of the blade, conforming to the so-called three-dimensional shape thereof.

It is known practice to manufacture reinforcements by hot shaping and machining a titanium alloy blank. Because of the complex geometry of this part, the forming and machining operations are numerous, lengthy and complex. The cost of manufacturing this part is therefore high.

Thus, there is a need for a method of manufacture that allows a reinforcement to be obtained for lower cost.

The applicant company has developed a method for manufacturing a part of this type which comprises a step of producing at least one fibrous structure by three-dimensional weaving of metallic wires, followed by the subjecting of the fibrous structure to a hot isostatic pressing operation to compact and diffusion bond the metallic wires in order to obtain a solid part. The metallic wires are advantageously drawn metallic wires.

The three-dimensional weaving makes it possible to shape the fibrous structure to conform to the cavity of a tooling fixture and thus obtain a part with complex geometry. Further, it is possible to make use of metallic wires with diameters that differ according to the thickness at a given point. Furthermore, the fibrous structure may comprise composite wires or coated wires made up of a ceramic fiber, such as SiC, coated with a metal alloy such as a titanium alloy.

The hot isostatic pressing (HIP) step allows, through compaction, the fibrous structure to be given its final shape and be densified by diffusion bonding together of the metallic wires and/or coatings. The solid part obtained has zero or very low porosity.

A patent application covering this method of manufacture and the reinforcement obtained was filed on Sep. 28, 2010 by the applicant company under number FR 10 57799.

SUMMARY OF THE INVENTION

The invention is aimed at an alternative way of embodying the method already filed.

According to the invention, the method for manufacturing a metal part by creating a structure with a fibrous structure of metallic fibers and subjecting the preform to hot isostatic pressing in a tooling fixture until a solid part is obtained, the tooling fixture comprising at least one first element with a cavity for molding the part, is characterized in that the first tooling fixture element is of elongate shape in a direction XX between two ends, the fibrous structure is created at least in part by winding at least one metallic wire around said first element along said direction, from one end to the other.

One advantage of creating the fibrous structure at least partially by winding around the tooling fixture element is that it allows this step of the method to be partially automated through the use of robots and reel pay-out means.

According to another feature, the method possibly includes incorporating composite wires into the fibrous structure, the composite wires comprising a ceramic fiber such as a silicon carbide fiber, coated with a metal such as a titanium alloy, the winding of metallic wire being in a metal analogous to that of the coating, notably titanium alloy.

The method allows the potential incorporation of fibrous structural elements formed by three-dimensional weaving of metallic and/or composite wires.

The part is obtained from a first tooling fixture element, the shape of which is elongate in a first direction. The fibrous structure obtained by winding metallic wire around said direction, from one end of the first element to the other, makes it possible to create a part which has a thickness that may vary along the first direction.

As mentioned hereinabove, the solid part is advantageously a turbine engine fan blade reinforcing edge. The composite wires are therefore preferably laid along that section of the part that forms the leading edge.

BRIEF DESCRIPTION OF THE DRAWINGS

The invention is described in greater detail in the description of some nonlimiting embodiments given with reference to attached drawings in which.

DETAILED DESCRIPTION OF ONE EMBODIMENT

Figure 1:
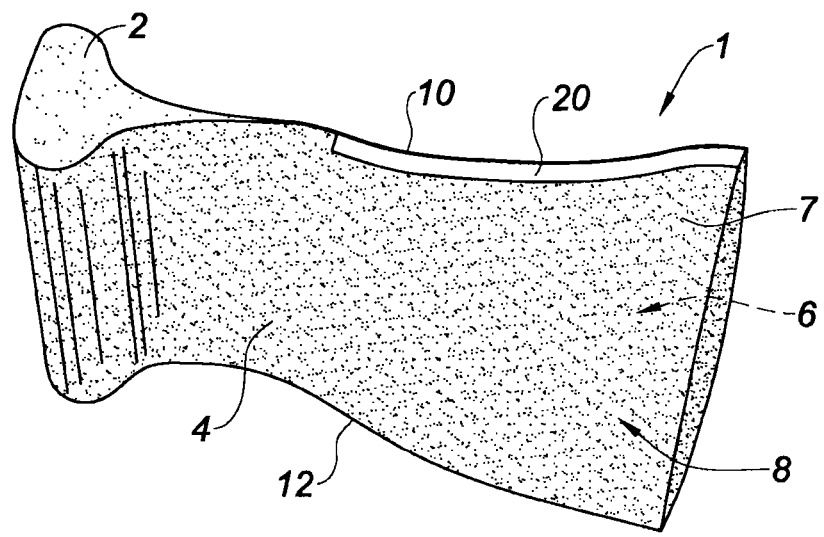
FIG. 1 is a perspective depiction of one example of a turbine engine fan blade equipped with one example of a reinforcement.

FIG. 1 depicts a turbine engine fan blade 1. It comprises a root 2 via which the blade is fixed to the rotor of the machine. This is extended by an airfoil of aerodynamic profile, running in a direction that is radial with respect to the axis of rotation of the fan. The airfoil 4 has an intrados face 8 and an extrados face 6 extending between the leading edge 10 on the upstream side and the trailing edge 12 on the downstream side (relative to the flow of gas). Reinforcements may be attached to the body 7 of the blade at the trailing edge and especially at the leading edge 10 in order to avoid or delay damage thereto, notably in the event of an impact.

In the example depicted, a reinforcement 20 is fixed to the body 7 of the blade, which is itself made of organic composite, at the leading edge 10 thereof. The leading edge 10 is formed at least in part by the reinforcement 20 which conforms to the overall shape of the blade.

Figure 2:
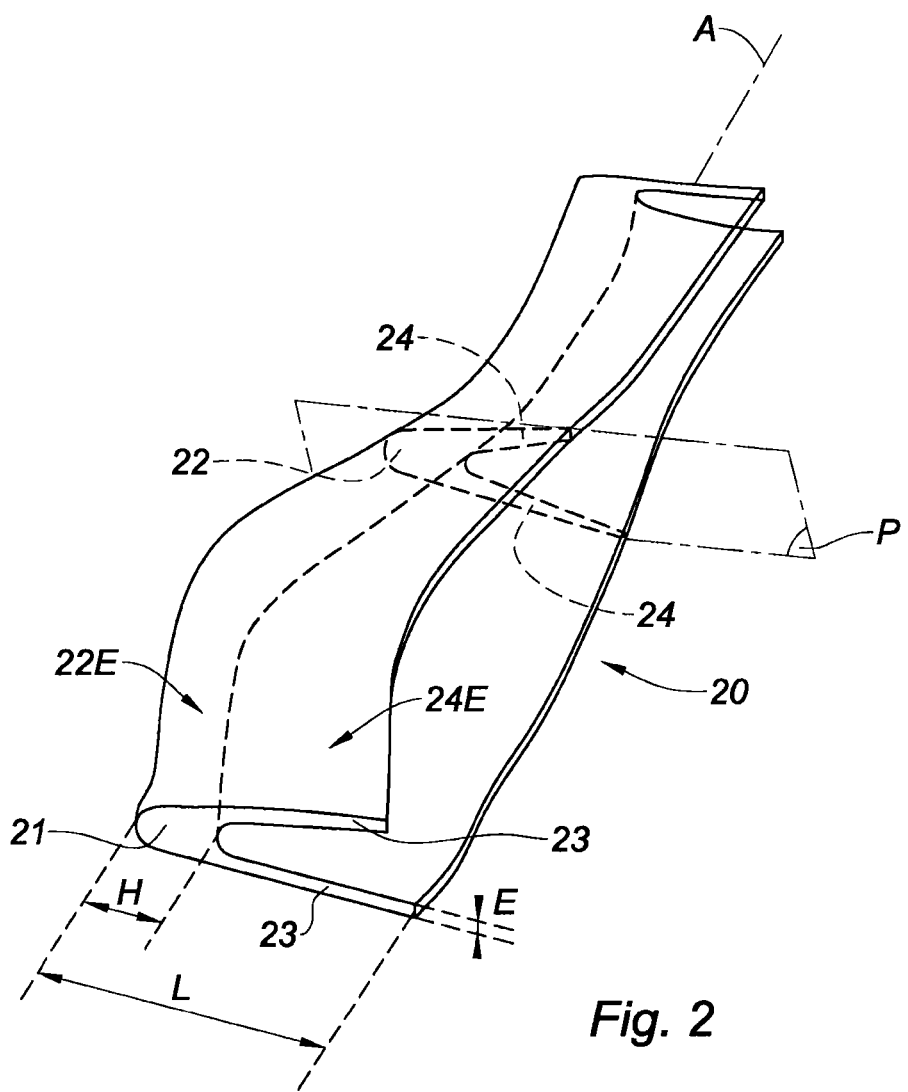
FIG. 2 shows the reinforcement in perspective.

The fan blade of FIG. 1 is of three-dimensional shape, twisting in its longitudinal direction and being transversely curved. The reinforcement 20 is also of complex shape, as may be seen in FIG. 2.

More specifically, the reinforcement extends longitudinally in a first direction A and, in cross section in a plane P of section perpendicular to this direction, has a central portion 22 of relatively great thickness extended by tapering branches 24. The reinforcement 20 thus has a longitudinal central section 21 of great thickness laterally flanked by two longitudinal flanks 23 which taper toward their distal end. The exterior face 24E of the flanks 23 runs in the continuity of the extrados 6 and intrados 8 faces. The exterior face 22E of the central part forms the leading edge 10 of the blade, once the reinforcement 20 has been attached to the body 7 of the airfoil.

One method of manufacturing a part such as the reinforcement 20 is now described. Whereas the method described in patent application FR 10 57799 involves creating a preform with a fibrous structure obtained by the weaving of metallic wires associated with coated wires, said preform being placed in a tooling fixture comprising a first and a second tooling fixture element, the method of the invention essentially consists in producing a preform with a fibrous structure that is obtained by winding of metallic wire.

Figure 3:
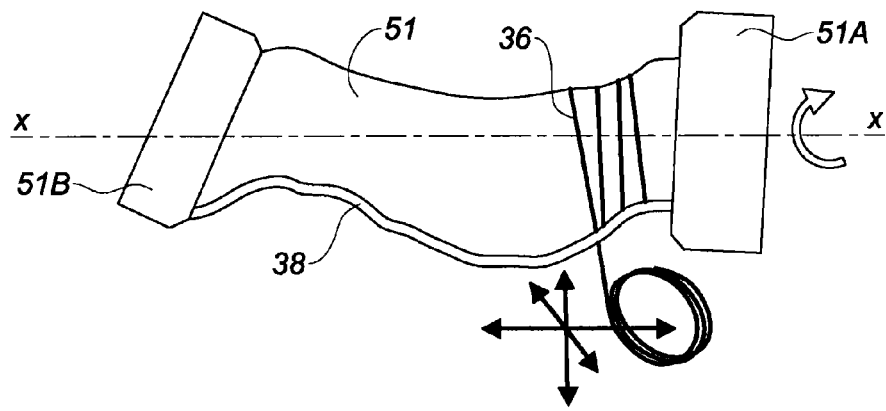
FIG. 3 schematically shows how a metallic wire is wound around the first tooling fixture element.

FIG. 3 schematically depicts a first tooling fixture element 51, preferably made of super alloy, one face of which forms part of the tooling fixture cavity. This first tooling fixture element 51 is of elongate shape in a direction XX which in this instance is an axis XX, with a cavity corresponding to the shape of part of the part that is to be obtained; it is provided with retaining blocks 51A, 51B at its ends. The profile here is configured for producing a fan blade reinforcement 20.

A preform 25 is produced by winding a metallic wire 36 around the tooling fixture element 51. The wire is paid out from a reel, not depicted in the figure. Winding may be preformed by rotating the element 51 about its axis XX while arranging the wire with respect to this axis such that it is always suitably oriented, in this instance perpendicular to the tangent to the curve of the leading edge.

Another way of winding is to mount the tooling fixture element 51 on a multiple-axis machine which orients the rotating element about its axis XX, with respect to the wire, the reel of which is fixed.

In the application relating to the production of a fan blade reinforcement, the wire 36 used is advantageously a drawn wire made of titanium alloy. The metallic wire may be a single wire or alternatively it is possible to wind wires of different diameters depending on the thicknesses desired in certain regions of the preform. Reinforcements may be incorporated into the preform, these being held in place by the windings of metallic wires. For example, a composite wires insert 38 may be positioned along the element in the zone that is to be reinforced, such as the leading edge of the blade. These composite wires comprise a ceramic central fiber 39, for example made of silicon carbide (SiC) coated 37 with a metal alloy such as a titanium alloy or an aluminum alloy in the case of a metallic wire made of aluminum.

Other reinforcements that could be incorporated are inserts and/or preforms based on coated composite wires such as SiC—Ti, SiC—Al, SiC—SiC, SiC-boron or preformed or woven metallic wires. Likewise, the preform may contain tapes based on Ti, Al, TiAl or any other compatible material having properties liable to allow superplastic formation and diffusion bonding.

Figures 4, 5:
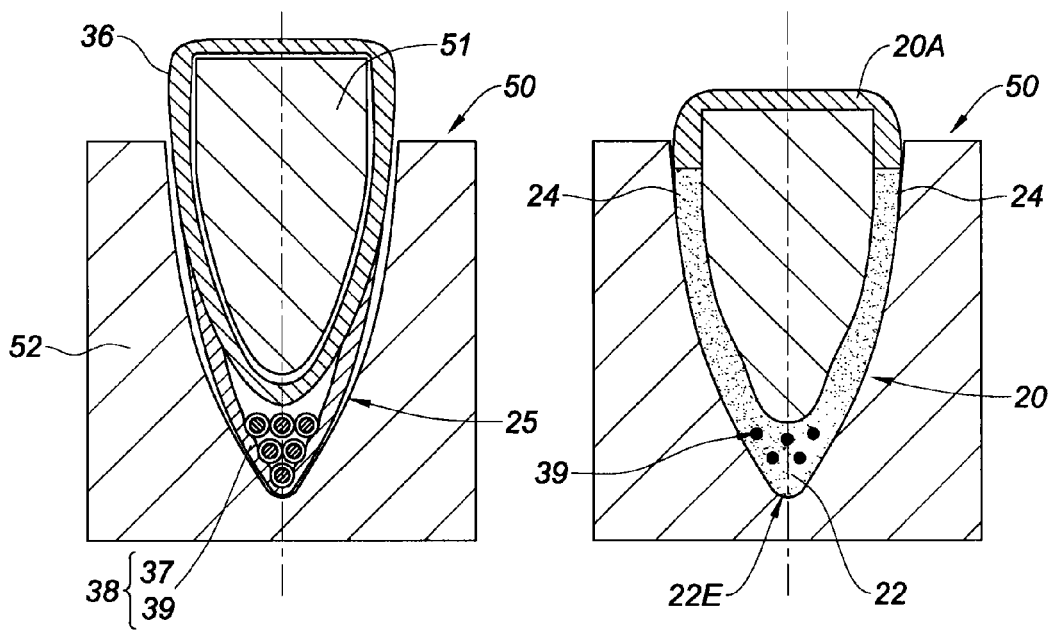
FIGS. 4 and 5 show the preform inside the tooling fixture prior to hot isostatic compression and then after the compaction treatment.

When the preform 25 has been produced, it is placed in the tooling fixture. As can be seen in FIGS. 4 and 5, the first tooling fixture element 51 with the preform 25 is placed in a second tooling fixture element 52 with a cavity suited to shaping the part. The assembled combination of the two elements 51 and 52 forms the tooling fixture 50. This could be formed of several tooling fixture elements, at least one of which constitutes the first element around which the fibrous preform is wound.

The preform 25 is compacted in the tooling fixture 50 completed by a suitable lid in an isothermic press or bagged in an autoclave with a vacuum hot isostatic compression treatment: for example, it is held at 940° C. for 120 minutes at a pressure of 1000 bar.

After treatment the non-useful section 20A of the part obtained is eliminated, notably by machining, so that only the section 20 that forms the reinforcement is kept. This metal part contains reinforcements 39 made of ceramic.

In a variant of the method, a pair of reinforcements is created by winding a metallic wire around two first tooling fixture elements assembled along a mandrel. This arrangement makes it possible to optimize manufacture and reduce the manufacturing cost.

The invention claimed is:

1. A method for manufacturing a metal part comprising:
creating a preform formed of a fibrous structure of metallic fibers around a first tooling fixture element of elongate shape in a direction between first and second ends of the first tooling fixture element, the fibrous structure being created at least in part by winding at least one metallic wire around the first tooling element along the direction from the first end to the second end of the first tooling fixture element;
subjecting the preform to hot isostatic pressing in a cavity of a second tooling fixture element, thereby compacting and diffusion bonding the metallic fibers until a solid part is obtained from the preform; and
removing a section of the solid part such that the solid part includes a central section laterally flanked by two longitudinal flanks each having a free distal end.

2. The method as claimed in claim 1, further comprising incorporating composite wires into the preform, the composite wires comprising ceramic fibers or silicon carbide fibers, coated with a metal or with a titanium alloy.

3. The method as claimed in claim 2, wherein the preform comprises fibrous structural elements formed by three-dimensional weaving of at least one of the metallic or the composite wires.

4. The method as claimed in claim 3, wherein the part has a thickness that varies along the direction.

5. The method as claimed in claim 1, wherein the part is a reinforcement for a blade.

6. The method as claimed in claim 5, wherein the part forms a reinforcement for a leading edge of the blade.

7. The method as claimed in claim 6, wherein the preform comprises composite wires along a section of the part that forms the leading edge of the blade.

8. The method as claimed in claim 1, further comprising:
removing the first tooling fixture element from the solid part after the section of the solid part is removed.

9. The method as claimed in claim 1, wherein the hot isostatic pressing is performed in an isothermic press or in an autoclave.

* * * * *